Feb. 2, 1943.   C. L. BAKER ET AL   2,310,009
WATER PURIFICATION
Filed Sept. 21, 1938
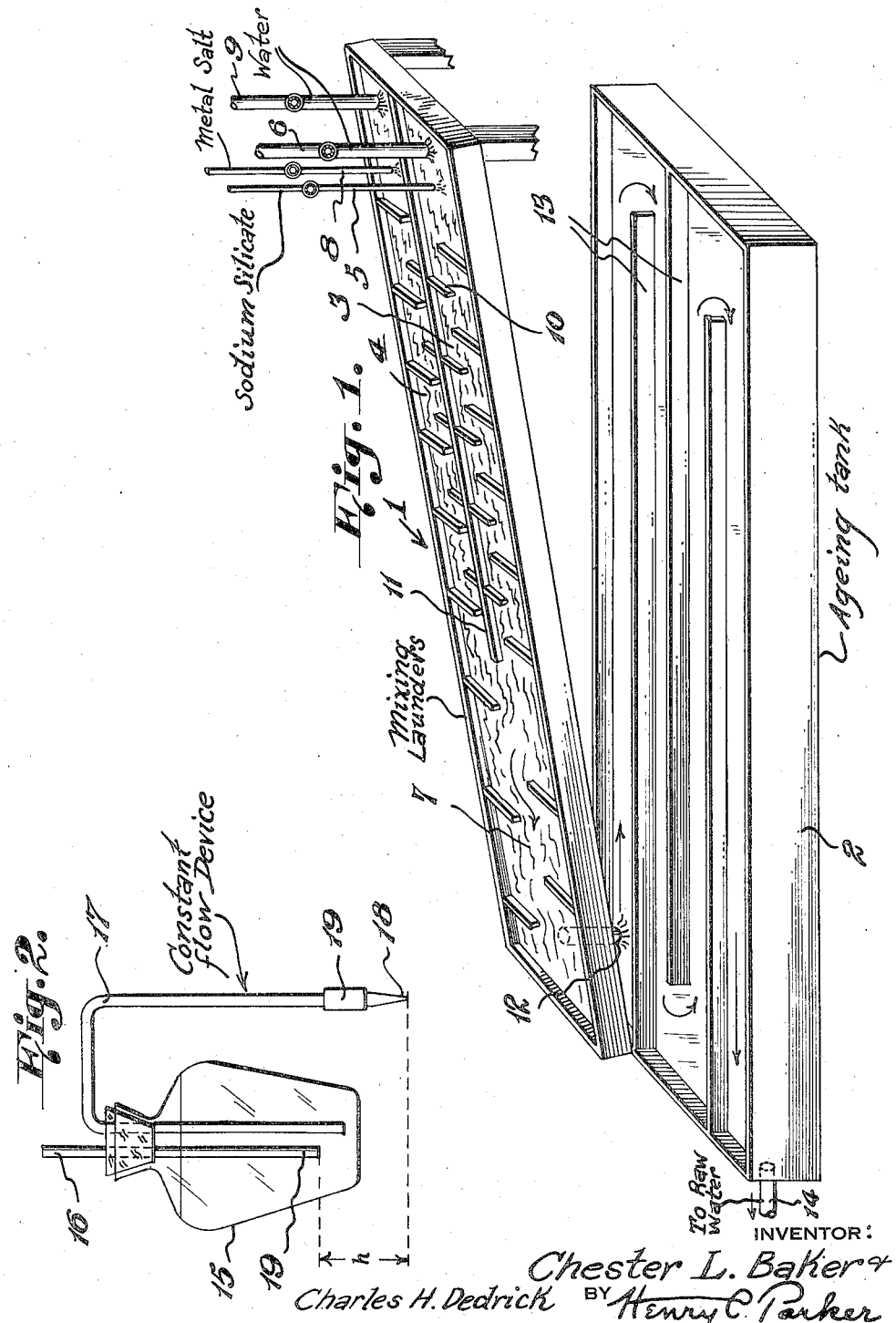
INVENTOR:
Chester L. Baker &
Charles H. Dedrick
BY Henry C. Parker
ATTORNEY Patented Feb. 2, 1943

2,310,009

UNITED STATES PATENT OFFICE 2,310,009

WATER PURIFICATION

Chester L. Baker, Penn Wynne, and Charles H. Dedrick, Drexel Hill, Pa., assignors to Philadelphia Quartz Company, Philadelphia, Pa., a corporation of Pennsylvania Application September 21, 1938, Serial No. 231,052

8 Claims. (Cl. 210—23)

This invention relates to water purification; and it comprises a method of purifying water by producing coagulation of the impurities contained therein, said method comprising mixing a dilute silicate of soda solution with a dilute solution of a metal salt of a metal capable of forming an insoluble silicate with said silicate of soda solution and advantageously aging the resulting mixture until it is in the state of incipient precipitation or gel formation, thereby forming a coagulation aid, and then adding said coagulation aid to the water to be purified together with one of the usual coagulants in proportions producing coagulation of the impurities in said water and substantial elimination of the added silicate and metal salt, said final step being preceded, if desired, by a step wherein said coagulation aid is diluted with water in order to stabilize it; all as more fully hereinafter set forth and as claimed.

In the usual practice of water purification, it is customary to add to the water a coagulant, such as aluminum sulfate, ferrous sulfate, ferric sulfate, lime, magnesium sulfate, etc., in amounts varying from a few parts per million to as high as 100 parts per million and even higher in extreme cases. The coagulant used is chosen in relation to the pH of the water. For example, aluminum sulfate is most effective over the range of 5 to 8 pH, whereas ferrous sulfate is effective over a pH range of 8.5 to 11.

After adding the coagulant the water is agitated for a period varying from minutes to hours in a mixing or coagulation basin. Then, provided that the water has a pH favorable to the particular coagulant used and also provided that the water carries a sufficient concentration of certain dissolved solids to create a favorable condition, there will separate from the water a voluminous floc which entraps the bulk of the suspended solids. The water is then held in large sedimentation basins for periods of from a few hours to as long as several days, in some cases, to permit the floc to settle. The water is then filtered to remove the remaining floc, given any other chemical treatment required, such as chlorination, and pumped into the mains for use.

Many variations in the above described customary procedure have been suggested in the art. One of the most recent modifications of this procedure involves the addition of sodium silicate to the water in various ways.

We have found an improved method of water coagulation, with the aid of sodium silicate. In this new method a liquor which may be called a coagulation aid is produced by mixing a dilute solution of sodium silicate with a dilute solution of a metal salt capable of forming an insoluble metal silicate with said sodium silicate solution. The concentrations of these solutions are so chosen that a precipitate of said metal salt or a gel will form in the mixed liquor if this is allowed to set without dilution or other treatment. The mixed liquor, that is, the coagulation aid is preferably allowed to age until it is in the state of incipient precipitation or gel formation and then it is diluted in order to stabilize it or it may be directly added to the raw water to be coagulated, one of the usual coagulants also being added to the water. Our tests with this new method indicate that it produces better results and that it is more widely applicable to raw waters of various types than previous methods making use of sodium silicate.

The usual explanation given for the success of the coagulation methods using sodium silicate is that the precipitation produced is due to the formation of colloidal hydrous $SiO_2$ having a strong negative charge. But this does not explain the improved results obtained by the present process, since it is evident that no colloidal $SiO_2$ would be expected to be formed in the coagulation aid formed in the manner described. A different explanation appears to be called for and our observations and experiments indicate rather clearly the nature of the newly discovered phenomenon.

When a solution of a salt of the nature of aluminum sulfate or ferrous sulfate is added to a solution of sodium silicate, having a ratio of $SiO_2$ to $Na_2O$ of about 3.25 to 1, a reaction somewhat similar to the following would be expected:

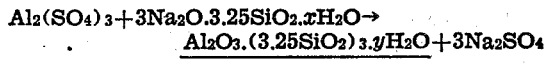

It is therefore believed that insoluble silicates are formed in our process, which may have formulae corresponding substantially to those underlined in the above equations. Of course the silica content may vary from that indicated in the above formulae. A general formula for the insoluble silicates formed in our process is $MeO \cdot xSiO_2$, wherein MeO represents the oxide of a metal forming an insoluble silicate and wherein $x$ may vary from about 1 to 10. It is believed that these insoluble silicates form what may be called foci or nuclei of precipitation which, when distributed in the raw water to be coagulated, are effective in accelerating the formation and subsidence of the desired floc.

We have found that best results are obtained when the mixture of metal salt and sodium silicate solutions, forming the coagulation aid of our invention, is aged to the point of incipient precipitation or gel formation just before its addition to the raw water. It is usually preferred to add the coagulation aid shortly before adding the bulk of the usual coagulant to the water, although substantial improvement in coagulation may be obtained if the coagulation aid is added simultaneously with or soon after the addition of a coagulating chemical.

We have found that best results are obtained in our process when the sodium silicate and the metal salt are employed in about the proportions by weight which are indicated in the above equations. This lends support to the theory which has been outlined above. The proportions of silicate can be increased above those indicated in the equations without substantially reducing the effectiveness of the coagulation aid but an increase in the metal salt content substantially above these proportions reduces the effectiveness of the resulting coagulation aid. In other words the sodium silicate should be employed in at least equi-molecular proportions to the metal salt in the production of our coagulation aid. The optimum molecular proportions of sodium silicate and metal salt to be employed range from about 1:1 to 3:1.

Our investigations show that any metal salt, which produces an insoluble silicate in the form of a precipitate or a gel when added to a dilute silicate solution, may be employed in our process. Fortunately this includes most of the salts which are employed as coagulants in the usual water purification methods. This means that the same salt can usually be employed to produce the coagulation aid as is used to produce coagulation. The advantages thereby gained are important. In the first place there is no necessity of providing new storage space for any chemical other than the sodium silicate. It is not necessary to purchase equipment for the handling of strong acids, as in certain prior art methods. The danger incident to the handling of such acids is eliminated. It is also true that the salts which are used as coagulants are frequently selected on the basis of their low cost and availability. And, of course, it is desirable to select the metal salt used in the production of the coagulation aid on the same basis. Examples of common coagulant salts which can be employed in our method are aluminum sulfate, ferrous sulfate, ferric sulfate, ferric chloride, lime and magnesium sulfate. Of course, other water soluble salts of these metals or combinations thereof can likewise be employed.

Our investigations show that silicates of soda having various ratios of $SiO_2$ to $Na_2O$ are effective in our process. Best results are obtained, however, with silicates which have a ratio of $\%SiO_2$ to $\%Na_2O$ ranging from about 2 to 4. The higher this ratio, in general, the more effective the solution is in producing aid to coagulation. The cheapest and most available sodium silicate solution has a ratio of 3.22 and we have found that this silicate gives excellent results.

The general method of practicing this invention is to prepare a diluted solution of silicate of soda and a dilute solution of the metal salt. These solutions are then mixed in such proportions that for each chemical equivalent of $Na_2O$ in the silicate of soda, there is added sufficient of the salt solution to provide approximately one or somewhat less than one chemical equivalent of the reactive salt. If the solutions used are sufficiently concentrated, or the mixture is allowed to stand for a sufficient length of time, a precipitate or a gel may form. The addition of this precipitate or gel to the water offers some aid to coagulation. However, more effective aid is rendered if the concentration of the coagulation aid, the temperature and the time of aging before use are so chosen that precipitation or gelation is avoided but would occur shortly if the coagulation aid should remain unused for a somewhat longer period, that is, best results are obtained when the coagulation aid is in the state of incipient precipitation or gelation at the time it is added to the raw water. When this stage has been reached the coagulation aid should be used as promptly as possible because it deteriorates upon further aging. This deterioration, however, can be substantially delayed by diluting the coagulation aid, when it has reached the optimum age, say in a ratio ranging from about 1 part of the coagulation aid to 1 part of water up to 1 part of the coagulation aid to 10 parts of water. A solution which might lose, for example, 50 per cent of its effectiveness in one hour or less, if undiluted, may retain 50 per cent of its effectiveness for a week or more when diluted.

Several of the advantages which are gained from the use of the present method have already been enumerated. Other advantages are that the flocs which are formed by the use of the present invention are formed more quickly, they are larger in size, tougher and denser, settling more rapidly and also producing a more effective clarification of the water than would be produced by the use of the same amount of coagulant without the use of our coagulation aid. With the use of our coagulation aid it is possible to employ a given coagulant for clarifying waters having a range of pH beyond the range in which said coagulant is normally effective or efficient in producing clarification. It is also possible to employ the present invention in such manner that the total quantity of coagulant required to produce a given clarity of water is substantially reduced, thereby resulting in a lower clarification cost. Owing to the fact that the floc forms more quickly and settles more rapidly by the use of the present invention, it is possible to employ coagulation and settling basins having a smaller size than is required without the aid of this invention. And owing to the greater clarity of the water going to the filters it is possible to substantially reduce the filter area. By reducing the size of the coagulation and settling basins and the filter area, as is possible under the present invention, a substantial saving may be effected in the over-all cost of a filter plant.

Our invention may be explained in somewhat greater detail by reference to the accompanying drawing which shows, more or less diagrammatically, an assembly of apparatus elements which can be employed in the continuous treatment of raw water to be coagulated, in accordance with the present invention. In this showing Fig. 1 is a perspective view of mixing launders and an aging tank for making the coagulation aid of the present invention, while Fig. 2 shows an apparatus adapted to provide a constant flow of silicate solution or metal salt solution to the mixing launders of Fig. 1.

The various details of the coagulation and feeding apparatus shown in the drawing are believed to be clear from the legends which are present on the two figures. The apparatus is made up in two parts, namely the mixing launders 1 and the aging tank 2. The mixing launders are in two sections 3 and 4, which are separated by the central baffle 11. Section 3 is adapted to provide a constant flow of a dilute sodium silicate solution, this section being fed at its upper end with a concentrated sodium silicate solution through the pipe 5 and with water through the pipe 6. These solutions become mixed as they flow down the launder and pass around the baffles 10, as shown by the arrows, towards the point 7 where the resulting dilute silicate solution is mixed with the dilute metal salt solution which is simultaneously prepared in launder section 4. The latter section is fed at the top with a concentrated metal salt solution through pipe 8 and with water through pipe 9, these solutions becoming thoroughly mixed during their passage through the launder and around the baffles on their way to point 7. The lower section of the mixing launders, below the baffle 7, serves to mix the dilute solutions of sodium silicate and of metal salt which are prepared in sections 3 and 4, respectively, that is, the coagulation aid of this invention is prepared in the lower end of these mixing launders. This coagulation aid then passes through the exit pipe 12 into the aging tank 2, where it passes back and forth lengthwise of the tank around the baffles 13, finally passing out through the pipe 14, and into the raw water to be coagulated or clarified. This aging tank is designed and has sufficient volume to provide for a retention period of from about ¼ to 4 hours. The aged coagulation aid is advantageously introduced into the raw water at such a point that it becomes thoroughly mixed with raw water before the usual coagulant is introduced.

In Fig. 2 we have shown a convenient apparatus for producing a constant flow of sodium silicate and of metal salt solution, such a flow being required in the feeding of these solutions at the upper end of the mixing launders. The concentrated solution of silicate or metal salt is introduced into the carboy, drum or other tank 15. This tank is provided with two tubes 16 and 17 which serve to produce a constant head of solution. Air is introduced through the tube 16 and the concentrated solution flows out of the tank through the siphon tube 17. It will be seen that the head of liquid is determined by the vertical distance $h$ between the constricted tip 18 of tube 17 and the lower end 19 of the air tube 16, this head of liquid determining the rate of flow of the solution. The flow of liquid can be adjusted by the use of various tips 18 having different degrees of constriction, by adjusting the vertical height of the tip in the rubber tube 19 and by adjusting the height of the tube 16 in the tank. When this device is used in the dilution of a concentrated sodium silicate solution, the tip 18 is advantageously kept immersed in the liquid in order to prevent the formation of a crust of silicate at the end of the tip. The constant level device of Fig. 2 can be started in operation by blowing through tube 16.

The following specific examples are illustrative of the use of the present invention. While Examples 1 and 3 relate to the so-called jar tests which are conventionally used in water works practice to determine optimum coagulating conditions, etc. It is evident that these tests can be readily adapted by those skilled in the art to actual large-scale practice. Tests of the nature of these jar tests are, of course, required prior to the adoption of our method in practical operation.

*Example 1*

19.4 grams of silicate of soda solution carrying 8.5 per cent $Na_2O$ and 28.7 per cent $SiO_2$ were diluted to 300 ml. with water. A second solution was prepared by dissolving 4 grams of commercial aluminum sulfate in 75 ml. of water. The two solutions were then rapidly and thoroughly mixed together at 20° C. and allowed to stand at this temperature for one hour when it was noted that the coagulation aid thus produced was in the condition of incipient precipitation. This coagulation aid was stabilized by diluting it with water to one liter. A jar test was then conducted on this stabilized coagulation aid.

Two one-liter beakers of water taken from the Delaware River at Philadelphia were equipped with mechanical stirrers of the same design and driven at the same slow speed. To the first of these was added 0.6 ml. of the above coagulation aid which was equivalent to 3.0 parts per million of $SiO_2$. 0.008 gram of commercial aluminum sulfate was then added. Simultaneously with this addition there was added to the second beaker 0.010 gram of commercial aluminum sulfate. These dosages provided the same equivalent concentration of 10 parts per million aluminum sulfate in each water sample but the first beaker contained in addition 3 parts per million of insoluble silicate expressed in terms of $SiO_2$ and derived from the added coagulation aid. The samples of water were then stirred and observed. At the end of 3½ minutes a visible floc had formed in the first beaker and at the end of 13 minutes this floc had reached an average diameter of about 3 mm. and had ceased to become larger. Visible floc formation did not occur in the other beaker until at the end of 8 minutes. This floc continued to grow in size for 36 minutes but then had a size of only 1 mm. in diameter. Upon stopping the agitation the floc in the first beaker settled completely in one minute's time, leaving a clear, bright supernatant water, whereas the floc in the second beaker was still partially suspended at the end of ten minutes.

*Example 2*

Our method was tested in a municipal filter plant operating on a daily production of 1.8 million gallons, using a water having a pH of 7.4 and a hardness of 83 parts per million of calcium carbonate equivalent, and was found to be very effective. An apparatus of the type shown in the drawing was provided to furnish an aged coagulation aid. One of the mixing launders was fed with a continuous flow of the same silicate of soda solution which was used in the above example, the flow being at the rate of 34.75 grams per minute. This was mixed in the launder with a similar continuous flow of 330 ml. of water per minute. This provided approximately 2.0 parts per million of silicate of soda based upon the water being treated. The second mixing launder was provided with a constant feed of a 30 per cent aluminum sulfate (commercial alum) solution flowing at the rate of 24.65 grams per minute, this being mixed continuously with a continuous feed of 330 ml. of water per minute. The diluted solutions of sodium silicate and of alum formed in the two mixing launders were then mixed together in the common launder of the apparatus shown in the drawing and the resulting coagulation aid was passed into the baffled aging tank having such a capacity that one hour and forty minutes were required for the coagulation aid to pass through. After this aging period the coagulation aid was then added to the raw water flowing into the plant. This treatment was followed by the addition of one grain per gallon of alum. A large dense floc formed within less than half an hour and while the water was still in the coagulation or mixing basin. Following two hours of sedimentation, the water was continuously filtered and found to have a zero turbidity. It was found possible at this plant to reduce the alum dosage to 0.6 grain per gallon, while using the coagulation aid as described, and still obtain satisfactory operation and a finished water of zero turbidity. In a similar experiment using alum alone without the advantage of our coagulation aid, it was impossible to obtain a satisfactory floc with less than 1.2 grains per gallon of alum and the floc which was formed was much smaller and settled poorly. The water after filtration had a turbidity of 0.2 part per million.

*Example 3*

This example illustrates the preparation and use of our coagulation aid, employing ferric sulfate as the metal salt. This coagulation aid was used to coagulate water in a conventional jar test.

19.4 grams of silicate of soda solution containing approximately 28.7 per cent $SiO_2$ and 8.5 per cent $Na_2O$ were dissolved in 300 ml. of water. 4 grams of commercial anhydrous ferric sulfate were dissolved in a small amount of water and then diluted to 75 ml. The two solutions were quickly and vigorously mixed at room temperature and then immediately diluted to 1 liter to form a stabilized coagulation aid.

Two one liter beakers were filled with Delaware River water and set on the agitating machine where both were slowly agitated under the same conditions. To the first beaker there was added 0.25 ml. of the coagulation aid prepared as above. After thorough mixing there was also added ferric sulfate solution in an amount equivalent to 14 parts per million. To the second beaker there was added a ferric sulfate solution equivalent to 15 parts per million. Observations on the flocculating characteristics, settling time and condition of the finished settled water are recorded in the table below. It will be noted that a total time of only 34 minutes was required when the coagulation aid was used and that the settled water was clearer.

| | With coagulation aid—Sample No. 1 | Without coagulation aid—Sample No. 2 |
|---|---|---|
| P. P. M. $SiO_2$ added | 1.4 | |
| Total P. P. M. $Fe_2(SO_4)_3$ added | 15 | 15 |
| Time to form first visible floc | 5½ min | 4 min |
| Total flocculating time | 21 min | 22 min |
| Approximate size of floc | 0.9 mm | 0.5 mm. and smaller |
| Settling time | 13 min | 36 min |
| Total time required | 34 min | 58 min |
| Clarity of finished water | Clear and sparkling | Nearly clear |

This example illustrates the use of rather concentrated solutions for the production of the coagulation aid, this resulting in a minimum aging period. The concentrated coagulation aid formed in this example would have formed a gel within about a minute, if it had not been quickly diluted in order to stabilize it. Concentrated coagulation aids of this nature must be handled quickly and, for this reason, it is generally better in commercial practice to employ more dilute solutions in order that the aging period may be of a somewhat more convenient length.

While we have illustrated what we consider to be the best embodiments of our invention it is obvious that various details of the procedures which have been outlined can be varied without departing from the purview of this invention. It is evident that each water to be treated presents a different problem and hence that no very specific and detailed instructions can be provided which would be applicable in all cases. It is believed, however, that our method can be used to advantage in the treatment of all natural waters which can be classed as of the common or usual type. This includes the purification of sewage as well as various industrial wastes and other liquors. In practically all cases wherein industrial liquors are now being clarified with the aid of conventional coagulants, improved results can be obtained with the use of the present invention.

Our coagulation aid can be used in proportions which vary rather widely with the conditions encountered. In some rather rare cases the usual coagulant can be dispensed with entirely, reliance being placed upon the coagulation aid alone to produce satisfactory coagulation and clarification. In other cases the quantity of coagulation aid employed to produce a substantial improvement in coagulation may amount to only about 1 per cent of the total quantity of coagulant employed, based on the weight of $SiO_2$ present. However, the optimum quantity of coagulation aid to be used for the more common types of raw waters varies from about 5 to 50 per cent of the coagulant dosage or from about 0.5 to 5.0 parts per million of raw water. With the assistance of these figures and of the preceding specific examples it is believed that those skilled in this art will find no difficulty in applying our method generally to the clarification of raw waters.

The solutions which are mixed to form the coagulation aid of this invention should be sufficiently dilute to prevent precipitation or gel formation in the coagulation aid produced by mixing them for a period of sufficient length to provide time for dilution of the coagulation aid or its addition to the raw water. As indicated previously the coagulation aid should either be added to the raw water or should be diluted to stabilize it shortly before precipitation or gel formation tends to take place. We have found that concentrations of sodium silicate and of metal salt ranging from about 2 to 10 per cent by weight are the most convenient to use and give excellent results. The coagulation aids produced by mixing these solutions have an optimum aging period ranging from about one minute to four hours. Other things being equal, the more concentrated the coagulation aid and the lower the proportion of silicate of soda to metal salt, the less time required to produce optimum aging. And the more dilute the solutions of sodium silicate and of metal salt, the greater the stability of the coagulation aid which results from mixing them, that is, the greater the stability after the point of incipient precipitation has been reached.

It is, of course, theoretically possible to employ such dilute solutions of metal salt and of sodium silicate that the resulting coagulation aid is substantially stabilized without further dilution. But the aging required in this case would be prohibitively long. In actual practice the desideratum is to employ solutions of sufficient concentration to require an aging period of convenient length to provide for the necessary handling of the coagulation aid, etc.

If it is desired to stabilize our coagulation aid it is only necessary to dilute it with water, preferably when it is in the state of incipient precipitation. We have found that, when the concentration of the $SiO_2$ in this stabilized coagulation aid ranges from about 0.2 to 1.0 per cent by weight, it will retain about 50 per cent of its effectiveness for a period ranging from about 3 to 10 days. Dilution of the coagulation aid appears to delay the growth of the micellae present which, presumably, form foci of precipitation when added to the raw water. It appears that there is a rather definite optimum size or state of molecular configuration for these micellae for producing the greatest aid to coagulation, this state being reached at about the point of incipient precipitation. At least this will explain most of the phenomena observed when using the present invention. Modifications of our invention, other than those indicated in the preceding discussion and falling within the scope of the following claims, will be immediately evident to those skilled in this art.

What we claim is:

1. In the process of producing coagulation and clarification of raw waters with the use of a coagulation aid and a final coagulant, the steps which comprise mixing a dilute solution of sodium silicate with a dilute solution of a metal salt, capable of forming an insoluble silicate with said sodium silicate solution, in such proportions as to provide at least about one molecular proportion of sodium silicate to each molecular proportion of metal salt, aging said mixture until it is substantially in the state of incipient precipitation, then adding the resulting coagulation aid to a raw water to be clarified not later than the addition of a final coagulant.

2. In the coagulation and clarification of raw waters, the process which comprises mixing a dilute solution of sodium silicate with a dilute solution of a metal salt, capable of forming an insoluble metal silicate with said silicate solution, in such proportions as to provide at least about one molecular proportion of sodium silicate to each molecular proportion of metal salt, thereby forming a coagulation aid, adding said coagulation aid to a raw water to be clarified while the said coagulation aid is substantially in the state of incipient precipitation, then adding a coagulant to said raw water in proportions producing floc formation in and clarification of said raw water, as well as substantial elimination of the said metal silicate.

3. The process of claim 2 wherein the resulting coagulation aid is aged to the state of incipient gel formation and is then diluted with sufficient water to stabilize it prior to its addition to said raw water.

4. In the coagulation and clarification of raw waters with the use of a coagulation aid, the process which comprises mixing a sodium silicate solution, having a ratio of % $SiO_2$ to % $Na_2O$ ranging from about 2 to 4 and a concentration ranging from about 2 to 10 per cent by weight, with a solution of a metal salt, capable of forming an insoluble metal silicate upon reaction with said silicate solution and having a concentration ranging from about 2 to 10 per cent by weight, the said solutions being mixed in such proportions as to provide at least about one molecular proportion of sodium silicate to each molecular proportion of metal salt, aging the resulting coagulation aid to bring it substantially to the state of incipient precipitation, then adding the coagulation aid to a raw water to be clarified, and adding a coagulant to said raw water in proportions sufficient to produce floc formation and clarification of said water.

5. The process of claim 4 wherein said metal salt is aluminum sulfate and wherein said coagulant is also aluminum sulfate.

6. The process of claim 4 wherein said metal salt is ferric sulfate and wherein said coagulant is also ferric sulfate.

7. In the process of coagulating and clarifying raw waters, the steps which comprise adding to a raw water to be clarified micellae of an insoluble metal silicate having the general formula $MeO.xSiO_2$, wherein MeO represents the oxide of a metal whose salts are capable of forming an insoluble silicate, when reacted in aqueous solution with solutions of sodium silicate, and $x$ may vary from about 1 to 10, said micellae being substantially in the state of incipient precipitation, then adding to said raw water a coagulant in amount sufficient to produce floc formation followed by precipitation with said micellae as foci of precipitation.

8. In the coagulation and clarification of raw waters with the use of a coagulation aid, the process which comprises continuously mixing a concentrated solution of silicate of soda with sufficient water to make a dilute solution, simultaneously mixing a concentrated solution of a metal salt, capable of forming an insoluble silicate upon reaction with sodium silicate, with sufficient water to make a dilute solution, continuously mixing said dilute solutions together in such proportions as to provide at least one molecular proportion of sodium silicate to each molecular proportion of metal salt, aging the resulting clarification aid to the point of incipient precipitation, then mixing said clarification aid with a raw water to be purified and finally adding a coagulant to said raw water in amount sufficient to produce floc formation and clarification, as well as substantial elimination of said metal silicate.

CHESTER L. BAKER.
CHARLES H. DEDRICK.

CERTIFICATE OF CORRECTION.

Patent No. 2,310,009.                         February 2, 1943.

CHESTER L. BAKER, ET AL.

It is hereby certified that error appears in the printed specification of the above numbered patent requiring correction as follows: Page 5, second column, line 8, claim 4, for "$CiO_2$" read --$SiO_2$--; and that the said Letters Patent should be read with this correction therein that the same may conform to the record of the case in the Patent Office.

Signed and sealed this 9th day of March, A. D. 1943.

(Seal)                                                 Henry Van Arsdale,
                                                         Acting Commissioner of Patents.